United States Patent
Kohzuki et al.

(10) Patent No.: US 9,493,662 B2
(45) Date of Patent: *Nov. 15, 2016

(54) ACTIVE ENERGY RAY-CURABLE INKJET INK, INK CONTAINER, AND INKJET DISCHARGING DEVICE

(71) Applicant: Ricoh Company, Ltd., Tokyo (JP)

(72) Inventors: Shizuka Kohzuki, Kanagawa (JP); Mie Yoshino, Kanagawa (JP); Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,658

(22) Filed: Sep. 18, 2015

(65) Prior Publication Data
US 2016/0009931 A1 Jan. 14, 2016

Related U.S. Application Data

(63) Continuation of application No. 14/524,502, filed on Oct. 27, 2014, now Pat. No. 9,169,408.

(30) Foreign Application Priority Data

Nov. 14, 2013 (JP) ................................ 2013-236027
Jul. 28, 2014 (JP) ................................ 2014-152731

(51) Int. Cl.
*G01D 11/00* (2006.01)
*C09D 11/00* (2014.01)
(Continued)

(52) U.S. Cl.
CPC ........... *C09D 11/101* (2013.01); *C09D 11/102* (2013.01); *C09D 11/30* (2013.01); *C09D 175/04* (2013.01); *C09D 175/06* (2013.01); *C09D 175/08* (2013.01)

(58) Field of Classification Search
CPC ...... B41J 11/002; C09D 11/06; C09D 11/38; B41M 5/0011; B41M 5/0047; B41M 5/5209
USPC ........ 347/85, 95, 96, 100; 106/31.13, 31.27, 106/31.6
See application file for complete search history.

(56) References Cited

U.S. PATENT DOCUMENTS 6,534,128 B1 3/2003 Carlson et al.
6,593,390 B1 7/2003 Johnson et al.
(Continued)

FOREIGN PATENT DOCUMENTS

EP 1826005 8/2007
EP 1 967 557 A1 9/2008
(Continued)

OTHER PUBLICATIONS

Search Report issued Dec. 3, 2014 in European Patent Application No. 14184974.
(Continued)

*Primary Examiner* — An Do
(74) *Attorney, Agent, or Firm* — Oblon, McClelland, Maier & Neustadt, L.L.P.

(57) ABSTRACT

Provided is an active energy ray-curable inkjet ink containing at least photopolymerizable compounds. The photopolymerizable compounds include: at least one monofunctional monomer selected from the group consisting of a monofunctional monomer of which homopolymer has a glass transition temperature of 90° C. or higher, a monofunctional monomer having a ring structure, and a monofunctional monomer of which homopolymer has a glass transition temperature of 90° C. or higher and that has a ring structure; and urethane (meth)acrylate.

12 Claims, 2 Drawing Sheets

(51) Int. Cl.

| | | |
|---|---|---|
| *C09D 11/101* | (2014.01) | |
| *C09D 11/102* | (2014.01) | |
| *C09D 175/04* | (2006.01) | |
| *C09D 175/06* | (2006.01) | |
| *C09D 175/08* | (2006.01) | |
| *C09D 11/30* | (2014.01) | |

(56) References Cited

U.S. PATENT DOCUMENTS

| | | | |
|---|---|---|---|
| 7,713,462 B2 | 5/2010 | Hayata et al. | |
| 8,299,142 B2 | 10/2012 | Yokoi | |
| 8,361,603 B2 | 1/2013 | Yokoi | |
| 8,801,167 B2 | 8/2014 | Katoh et al. | |
| 8,926,083 B2 | 1/2015 | Hiroaka | |
| 8,926,084 B2 | 1/2015 | Hiroaka | |
| 9,051,481 B2 * | 6/2015 | Yoshino | C09D 11/101 |
| 2002/0086914 A1 | 7/2002 | Lee et al. | |
| 2003/0021961 A1 | 1/2003 | Ylitalo et al. | |
| 2003/0083396 A1 | 5/2003 | Ylitalo et al. | |
| 2008/0287563 A1 | 11/2008 | Lee et al. | |
| 2009/0087626 A1 | 4/2009 | Hayata et al. | |
| 2009/0099277 A1 | 4/2009 | Nagvekar et al. | |
| 2009/0117286 A1 | 5/2009 | Ishikawa | |
| 2009/0117343 A1 | 5/2009 | Nishida et al. | |
| 2009/0171007 A1 | 7/2009 | Jonai et al. | |
| 2010/0080907 A1 | 4/2010 | Yamashita et al. | |
| 2010/0233448 A1 | 9/2010 | Kameyama et al. | |
| 2011/0159251 A1 | 6/2011 | Sato et al. | |
| 2011/0242191 A1 | 10/2011 | Mochizuki | |
| 2012/0176456 A1 | 7/2012 | Maekawa et al. | |
| 2013/0260092 A1 | 10/2013 | Araki et al. | |
| 2015/0232675 A1 | 8/2015 | Yoshino et al. | |

FOREIGN PATENT DOCUMENTS

| | | |
|---|---|---|
| EP | 2 228 416 A1 | 9/2010 |
| EP | 2 371 910 A1 | 10/2011 |
| EP | 2 644 664 A1 | 10/2013 |
| JP | 2000-38531 A | 2/2000 |
| JP | 2003-145573 A | 5/2003 |
| JP | 3493606 | 11/2003 |
| JP | 2004-516354 A | 6/2004 |
| JP | 2004-518787 | 6/2004 |
| JP | 3619778 | 11/2004 |
| JP | 2006-518781 A | 8/2006 |
| JP | 4214141 | 11/2008 |
| JP | 2009-102644 | 5/2009 |
| JP | 4310355 | 5/2009 |
| JP | 2010-132780 A | 6/2010 |
| JP | 2010-144149 | 7/2010 |
| JP | 2010-222385 | 10/2010 |
| JP | 2010-222387 | 10/2010 |
| JP | 2011-052107 | 3/2011 |
| JP | 2011-68716 | 4/2011 |
| JP | 4715752 | 4/2011 |
| JP | 4754779 | 6/2011 |
| JP | 2011-208018 | 10/2011 |
| JP | 4865483 | 11/2011 |
| JP | 2012-007107 | 1/2012 |
| JP | 4899430 | 1/2012 |
| JP | 2012-067314 | 4/2012 |
| JP | 2012-140550 | 7/2012 |
| JP | 2012-214603 A | 11/2012 |
| JP | 2013-022932 | 2/2013 |
| JP | 2013-57043 A | 3/2013 |
| JP | 2013-095910 | 5/2013 |
| JP | 5265916 | 5/2013 |
| JP | 2013-116927 | 6/2013 |
| JP | 2013-142104 | 7/2013 |
| JP | 2013-227515 A | 11/2013 |
| WO | WO 02/085638 A1 | 10/2002 |
| WO | WO 03/010249 A1 | 2/2003 |
| WO | WO 2007/055332 | 5/2007 |
| WO | WO 2013/069580 | 5/2013 |

OTHER PUBLICATIONS

U.S. Appl. No. 14/474,781, filed Sep. 2, 2014 Inventor: Yoshino, et al.
U.S. Appl. No. 14/853,141, filed Sep. 14, 2015, Kohzuki, et al.
Office Action issued Nov. 10, 2015 in Japanese Patent Application No. 2014-152731.
Japanese Information Offer Forms issued Jan. 14, 2016 in Application No. 2014-152731.

* cited by examiner

ACTIVE ENERGY RAY-CURABLE INKJET INK, INK CONTAINER, AND INKJET DISCHARGING DEVICE

CROSS REFERENCE TO RELATED APPLICATIONS

The present application is a continuation of U.S. patent application Ser. No. 14/524,502, filed on Oct. 27, 2014, which is based on and claims priority from Japanese Patent Application No. 2013-236027, filed on Nov. 14, 2013, and Japanese Patent Application No. 2014-152731, filed on Jul. 28, 2014, the disclosures of each of the above are hereby incorporated by reference in their entirety.

BACKGROUND OF THE INVENTION

1. Field of the Invention

The present invention relates to an active energy ray-curable inkjet ink, an ink container, and an inkjet discharging device.

2. Description of the Related Art

In recent years, studies have been made for replacing water-based and solvent-based inkjet inks with active energy ray-curable inkjet inks having relatively low volatility.

Recently, there have been increasing demands for the active energy ray-curable inkjet inks to be inkjet-printable onto also a base material that is subjected to stretching, punching, etc. later.

However, a cured film of a conventional active energy ray-curable inkjet ink containing a monofunctional photopolymerizable compound and a multifunctional photopolymerizable compound has a high coated film hardness. Therefore, in the stretching or punching performed after the printing, there occurs a problem that the cured film cannot conform to the deformation of the base material, and that stretchability and punchability of the printed product are poor. Furthermore, because the active energy ray-curable inkjet inks are greatly inferior to the conventional solvent-based inks, expected replacement has not yet advanced drastically up until now, particularly in high-quality applications where molding is required.

For example, there is proposed an ink composition that contains: a photopolymerization initiator; and as a photopolymerizable compound, a specific amount of a photopolymerizable monomer containing one ethylenic unsaturated double bond and at least one urethane bond, and that has favorable stretchability and close adhesiveness (see Japanese Patent Application Laid-Open (JP-A) No. 2012-7107).

There is also proposed a curable composition for surface protection that contains polyester-based urethane (meth) acrylate having a weight average molecular weight of 500 or greater (see JP-A No. 2012-67314).

There is also proposed an irradiation-curable inkjet ink that contains: a unifunctional monomer substance having one irradiation-polymerizable unsaturated carbon-carbon bond; a multifunctional monomer substance having a plurality of irradiation-polymerizable unsaturated carbon-carbon bonds; and an oligomer having at least one irradiation-polymerizable unsaturated carbon-carbon bond (see Japanese Patent (JP-B) No. 3619778).

There is also proposed an ultraviolet-curable ink that contains a reactive oligomer having a glass transition temperature (Tg) of from −25° C. to 70° C., or a reactive prepolymer having a glass transition temperature (Tg) of from −25° C. to 70° C., or both thereof, that has a specific viscosity and a specific flexibility, and that is excellent in scratch resistance and adhesiveness (see JP-B No. 4754779).

There is also proposed an active energy ray-curable inkjet ink that contains as polymerizable monomers, a specific monofunctional monomer and a specific multifunctional monomer, wherein a cured film of the ink has a mass change ratio of 30% by mass or lower after immersed in the ink for 30 seconds, and a cured film of the ink has a cure shrinkage ratio of 5% or lower (see JP-B No. 4899430).

SUMMARY OF THE INVENTION

An object of the present invention is to provide an active energy ray-curable inkjet ink with which a cured product excellent in hardness, stretchability, and punchability at the same time can be obtained.

An active energy ray-curable inkjet ink as means for solving the problems described above contains at least:
photopolymerizable compounds,
wherein the photopolymerizable compounds include: at least one monofunctional monomer selected from the group consisting of a monofunctional monomer of which homopolymer has a glass transition temperature of 90° C. or higher, a monofunctional monomer having a ring structure, and a monofunctional monomer of which homopolymer has a glass transition temperature of 90° C. or higher and that has a ring structure; and urethane (meth)acrylate.

The present invention can solve the conventional problems described above, achieve the object described above, and provide an active energy ray-curable inkjet ink with which a cured product excellent in hardness, stretchability, and punchability at the same time can be obtained.

DETAILED DESCRIPTION OF THE INVENTION (Active Energy Ray-Curable Inkjet Ink)

An active energy ray-curable inkjet ink of the present invention contains at least a photopolymerizable compound, and further contains other components according to necessity.

<Photopolymerizable Compounds>

The photopolymerizable compounds are compounds that produce a polymerization reaction and cure in response to an active energy ray (an ultraviolet ray, an electron beam, etc.).

The active energy ray-curable inkjet ink contains as the photopolymerizable compounds: at least one monofunctional monomer selected from the group consisting of a monofunctional monomer of which homopolymer has a glass transition temperature of 90° C. or higher, a monofunctional monomer having a ring structure, and a monofunctional monomer of which homopolymer has a glass transition temperature of 90° C. or higher and that has a ring structure; urethane (meth)acrylate; and further, any other monomer according to necessity. The term "monofunctional" of the monofunctional monomer means that a monomer has one unsaturated carbon-carbon bond.

—Monofunctional Monomer of which Homopolymer has Glass Transition Temperature of 90° C. Or Higher—

Examples of the monofunctional monomer of which homopolymer has a glass transition temperature (Tg) of 90° C. or higher include hydroxyethyl (meth)acrylamide, dimethylaminopropyl acrylamide, isobornyl (meth)acrylate, (meth)acryloyl morpholine, adamantyl (meth)acrylate, dicyclopentenyl (meth)acrylate, dicyclopentenyl oxyethyl (meth)acrylate, 3,3,5-trimethylcyclohexane (meth)acrylate, N-vinyl caprolactam, and tribromophenyl (meth)acrylate. One of these may be used alone, or two or more of these may be used in combination.

The content of the monofunctional monomer of which homopolymer has a glass transition temperature of 90° C. or higher is preferably 50% by mass or greater, and more preferably 80% by mass or greater, relative to the whole amount of the photopolymerizable compounds. The upper limit of the content is not particularly limited, and may be appropriately selected depending on the blending ratios of other photopolymerizable compounds. When the content is 50% by mass or greater, it is easier to achieve the advantage of being able to impart hardness and stiffness to a cured film and improve the pencil hardness thereof.

—Monofunctional Monomer Having Ring Structure—

Examples of the monofunctional monomer having a ring structure include cyclohexyl acrylate, tetrahydrofurfuryl acrylate, benzyl acrylate, methylphenoxyethyl acrylate, 2-phenoxyethyl acrylate, phenoxy acrylate, phenoxydiethylene glycol acrylate, N-vinyl pyrrolidone, 2-hydroxy-3-phenoxypropyl (meth)acrylate, 1,4-cyclohexanedimethanol monoacrylate, and (meth)acryloyl morpholine, or ethylene oxide, or propylene oxide, or both adduct of these. One of these may be used alone, or two or more of these may be used in combination.

The content of the monofunctional monomer having a ring structure is preferably 50% by mass or greater, or more preferably 80% by mass or greater, relative to the whole amount of the photopolymerizable compounds. The upper limit of the content is not particularly limited and may be appropriately selected depending on the blending ratios of other photopolymerizable compounds. When the content is 50% by mass or greater, it is easier to achieve the advantage of being able to impart hardness and stiffness to a cured film and improve the pencil hardness thereof.

—Monofunctional Monomer of which Homopolymer has Glass Transition Temperature of 90° C. Or Higher, and that has Ring Structure—

Examples of the monofunctional monomer of which homopolymer has a glass transition temperature (Tg) of 90° C. or higher, and that has a ring structure include isobornyl (meth)acrylate, (meth)acryloyl morpholine, adamantyl (meth)acrylate, dicyclopentenyl (meth)acrylate, dicyclopentenyl oxyethyl (meth)acrylate, 3,3,5-trimethylcyclohexane (meth)acrylate, N-vinyl caprolactam, and tribromophenyl (meth)acrylate. One of these may be used alone, or two or more of these may be used in combination.

The content of the monofunctional monomer of which homopolymer has a glass transition temperature (Tg) of 90° C. or higher, and that has a ring structure is preferably 50% by mass or greater, and more preferably 80% by mass or greater, relative to the whole amount of the photopolymerizable compounds. The upper limit of the content is not particularly limited and may be appropriately selected depending on the blending ratios of other photopolymerizable compounds. When the content is 50% by mass or greater, it is easier to achieve the advantage of being able to impart hardness and stiffness to a cured film and improve the pencil hardness thereof.

The glass transition temperature (Tg) of the homopolymer means the glass transition temperature of a cured product of the homopolymer. Here, the value Tg is a catalog value if there is any, or a value measured according to differential scanning calorimetry (DSC) if there is no catalog value. A method for measuring the glass transition temperature will be described later in detail.

—Urethane (Meth)Acrylate—

The urethane meth(acrylate) is not particularly limited, and arbitrary urethane meth(acrylate) may be selected according to the purpose. Examples thereof include: UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 manufactured by Nippon Synthetic Chemical Industry Co., Ltd.; CN929, CN961E75, CN961H81, CN962, CN963, CN963A80, CN963B80, CN963E75, CN963E80, CN963J85, CN965, CN965A80, CN966A80, CN966H90, CN966J75, CN968, CN981, CN981A75, CN981B88, CN982, CN982A75, CN982B88, CN982E75, CN983, CN985B88, CN9001, CN9002, CN9788, CN970A60, CN970E60, CN971, CN971A80, CN972, CN973A80, CN973H85, CN973J75, CN975, CN977C70, CN978, CN9782, CN9783, CN996, and CN9893 manufactured by Tomoe Engineering Co., Ltd.; and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 manufactured by Daicel-Cytec Ltd. One of these may be used alone, or two or more of these may be used in combination.

Among the urethane (meth)acrylates, polyester-based urethane (meth)acrylate, polyether-based urethane (meth)acrylate, or polycarbonate-based urethane (meth)acrylate, or any combination thereof that has/have 2 or more unsaturated carbon-carbon bonds and a weight average molecular weight of from 5,000 to 13,000 is/are preferable, because such urethane (meth)acrylate(s) is/are excellent in adhesiveness to various materials, and excellent in strongness, flexibility, chemical resistance, and low temperature properties.

Urethane (meth)acrylate that has from 2 to 5 unsaturated carbon-carbon bonds is more preferable, and urethane (meth)acrylate that has 2 unsaturated carbon-carbon bonds is the most preferable. When the number of unsaturated carbon-carbon bonds is 2, particularly excellent punchability can be obtained.

The weight average molecular weight is a standard polystyrene equivalent weight average molecular weight, and can be measured with a high-performance liquid chromatography ("WATERS 2695 (main device)" and "WATERS 2414 (detector)" manufactured by Nihon Waters K.K.) and three columns in series (columns: SHODEX GPC KF-806L (with an exclusion limit molecular weight: $2 \times 10^7$, a separation range: from 100 to $2 \times 10^7$, a number of theoretical plates: 10,000 per column, a filler: a styrene/divinyl benzene copolymer, and a filler particle diameter: 10 μm)).

Examples of the polyester-based urethane (meth)acrylate include UV-3010B (with a weight average molecular weight Mw: 9,690, and a number of unsaturated carbon-carbon bonds: 2), UV-3200B (with a weight average molecular weight Mw: 10,000, and a number of unsaturated carbon-carbon bonds: 2), UT-5454 (with a weight average molecular weight Mw: 10,000, and a number of unsaturated carbon-carbon bonds: 2), and UT-5449 (with a weight average molecular weight Mw: 10,000, and a number of unsaturated carbon-carbon bonds: 2) all manufactured by Nippon Synthetic Chemical Industry Co., Ltd. One of these may be used alone, or two or more of these may be used in combination.

Examples of the polyether-based urethane (meth)acrylate include UV-3300B (with a weight average molecular weight Mw: 13,000, and a number of unsaturated carbon-carbon bonds: 2), and UV-6630B (with a weight average molecular weight Mw: 5,000, and a number of unsaturated carbon-carbon bonds: 2) both manufactured by Nippon Synthetic Chemical Industry Co., Ltd. One of these may be used alone, or two or more of these may be used in combination.

Examples of the polycarbonate-based urethane (meth)acrylate include: UV-3310B (with a weight average molecular weight Mw: 5,000, and a number of unsaturated carbon-carbon bonds: 2) manufactured by Nippon Synthetic Chemical Industry Co., Ltd.; and UN-9000PEP (with a weight average molecular weight Mw: 5,000, and a number of unsaturated carbon-carbon bonds: 2) and UN-9200A (with a weight average molecular weight Mw: 13,000, and a number of unsaturated carbon-carbon bonds: 2) manufactured by Negami-Chemical Industrial Co., Ltd. One of these may be used alone, or two or more of these may be used in combination.

When commercially available products are used as the polyester-based urethane (meth)acrylate, the polyether-based urethane (meth)acrylate, and the polycarbonate-based urethane (meth)acrylate, the number of functional groups indicated as a physical property means the number of unsaturated carbon-carbon bonds.

The content of the urethane (meth)acrylate is preferably from 5% by mass to 15% by mass, and more preferably from 10% by mass to 15% by mass, relative to the whole amount of the photopolymerizable compounds. When the content is from 5% by mass to 15% by mass, it is easier to achieve the advantage of simultaneous satisfaction of stretchability and punchability.

—Bifunctional Monomer—

It is preferable that the active energy ray-curable inkjet ink of the present invention contain a bifunctional monomer having two unsaturated carbon-carbon bonds, in addition to the photopolymerizable compounds.

Examples of the bifunctional monomer include 1,3-butylene glycol di(meth)acrylate, 1,4-butanediol di(meth)acrylate, diethylene glycol di(meth)acrylate, 1,6-hexanediol di(meth)acrylate, polyethylene glycol (200) di(meth)acrylate, tetraethylene glycol di(meth)acrylate, triethylene glycol di(meth)acrylate, tripropylene glycol di(meth)acrylate, polyethylene glycol (400) di(meth)acrylate, ethoxylated (3) bisphenol A di(meth)acrylate, dipropylene glycol di(meth)acrylate, alkoxylated hexanediol di(meth)acrylate, ethoxylated (4) bisphenol A di(meth)acrylate, ethoxylated (10) bisphenol A di(meth)acrylate, polyethylene glycol (600) di(meth)acrylate, tricyclodecane dimethanol di(meth)acrylate, 1,9-nonanediol di(meth)acrylate, 1,10-decanediol di(meth)acrylate, neopentyl glycol di(meth)acrylate, polytetramethylene glycol di(meth)acrylate, 3-methyl-1,5-pentanediol di(meth)acrylate, and dimethylol-tricyclodecane di(meth)acrylate. One of these may be used alone, or two or more of these may be used in combination.

Among these, polyethylene glycol (200) diacrylate, polyethylene glycol (400) diacrylate, polyethylene glycol (600) diacrylate, 1,3-butylene glycol diacrylate, 1,4-butanediol diacrylate, 1,6-hexanediol diacrylate, 1,9-nonanediol diacrylate, 1,10-decanediol diacrylate, and neopentyl glycol diacrylate are preferable.

Polyethylene glycol (200) diacrylate, polyethylene glycol (400) diacrylate, and polyethylene glycol (600) diacrylate mentioned above are represented by the chemical formulae below.

Polyethylene glycol (200) diacrylate

$CH_2=CH-CO-(OC_2H_4)n-OCOCH=CH_2$ where $n \approx 4$

Polyethylene glycol (400) diacrylate $CH_2=CH-CO-(OC_2H_4)n-OCOCH=CH_2$ where $n \approx 14$ Polyethylene glycol (600) diacrylate $CH_2=CH-CO-(OC_2H_4)n-OCOCH=CH_2$ where $n \approx 14$ The content of the bifunctional monomer having two or more unsaturated carbon-carbon bonds is preferably from 1% by mass to 10% by mass, and more preferably from 1% by mass to 5% by mass, relative to the whole amount of the photopolymerizable compounds. When the content is 1% by mass or greater, favorable punchability can be obtained. When the content is 10% by mass or less, favorable stretchability can be obtained.

<Photopolymerization Initiator>

A (meth)acrylic acid ester compound, a (meth)acrylamide compound, and a vinyl ether compound as examples of photopolymerization initiators are known to have also cationic polymerizability. Such photo-cationic polymerization initiators not only are generally expensive, but also produce a slight amount of a strong acid even under a non-light-irradiated condition. This necessitates a special care such as imparting acid resistance to an ink supply path inside an inkjet discharging device. This raises constraints on the selection of the members to constitute the inkjet discharging device. As compared with this, the active energy ray-curable inkjet ink of the present invention can use a photopolymerization initiator which is inexpensive and does not produce a strong acid. This makes it possible to produce the ink inexpensively and makes it easy to select the members of the inkjet discharging device. Needless to say, when a very highly energetic light source such as an electron beam, and α, β, γ, and X rays is used, a polymerization reaction can progress without a polymerization initiator. This fact has conventionally been known to the public, and will not be explained in detail here.

Examples of the photopolymerization initiator include a molecule cleavage type photopolymerization initiator, and a hydrogen withdrawing type photopolymerization initiator.

Examples of the molecule cleavage type photopolymerization initiator include 2,2-dimethoxy-1,2-diphenylethan-1-on, 1-hydroxycyclohexyl phenyl ketone, 2-hydroxy-2-methyl-1-phenylpropan-1-on, 1-[4-(2-hydroxyethoxy)-phenyl]-2-hydroxy-2-methyl-1-propan-1-on, 2-hydroxy-1-{4-[4-(2-hydroxy-2-methylpropionyl)benzyl]phenyl}-2-methyl-1-propan-1-on, oligo[2-hydroxy-2-methyl-1-[4-(1-methylvinyl)phenyl]propanone, phenylglyoxylic acid methyl ester, 2-methyl-1-[4-(methylthio)phenyl]-2-morpholino propan-1-on, 2-benzyl-2-dimethylamino-1-(4-morpholino phenyl)butanone-1,2-dimethylamino-2-(4-methylbenzyl)-1-(4-morpholin-4-yl-phenyl)butan-1-on, bis(2,4,6-trimethylbenzoyl)phenylphosphine oxide, bis(2,6-dimethoxybenzoyl)-2,4,4-trimethyl-pentylphosphine oxide, 2,4,6-trimethylbenzoylphosphine oxide, 1,2-octanedione-[4-(phenylthio)-2-(o-benzoyloxime)], ethanone-1-[9-ethyl- 6-(2-methylbenzoyl)-9H-carbazol-3-yl]-1-(O-acetyl oxime), [4-(methylphenylthio)phenyl]phenylmethanone, and oligo[2-hydroxy-2-methyl-1-[4-(1-methylvinyl)phenyl] propanone. One of these may be used alone, or two or more of these may be used in combination.

Examples of the hydrogen withdrawing type photopolymerization initiator include: benzophenone-based compounds such as benzophenone, methylbenzophenone, methyl-2-benzoylbenzoate, 4-benzoyl-4'-methyldiphenyl sulfide, and phenylbenzophenone; and thioxanthone-based compounds such as 2,4-diethyl thioxanthone, 2-chloro thioxanthone, isopropyl thioxanthone, and 1-chloro-4-propyl thioxanthone. One of these may be used alone, or two or more of these may be used in combination.

The content of the photopolymerization initiator is not particularly limited, and may be appropriately selected according to the purpose. However, it is preferably from 1% by mass to 20% by mass, and more preferably from 5% by mass to 10% by mass, relative to the whole amount of the polymerizable compounds.

<<Polymerization Accelerator>>

As a polymerization accelerator, an amine compound can be used in combination with the photopolymerization initiator.

Examples of the amine compound include ethyl p-dimethylamino benzoate, 2-ethylhexyl p-dimethylaminobenzoate, methyl p-dimethylaminobenzoate, 2-dimethylaminoethyl benzoate, and butoxyethyl p-dimethylaminobenzoate.

<Other Components>

Examples of the other components include a colorant, a polymerization inhibitor, a surfactant, a light amplifying agent, and a polar group-containing polymeric pigment dispersant.

<<Colorant>>

Publicly-known dyes and pigments can be used as the colorant. Examples of the pigments include inorganic pigments and organic pigments. Various inorganic pigments and organic pigments may be used according to necessity depending on the physical properties of the ink.

Examples of black pigments include carbon black produced according to a furnace method or a channel method.

Examples of yellow pigments include Pig.Yellow-based pigments such as pigment yellow 1, pigment yellow 2, pigment yellow 3, pigment yellow 12, pigment yellow 13, pigment yellow 14, pigment yellow 16, pigment yellow 17, pigment yellow 73, pigment yellow 74, pigment yellow 75, pigment yellow 83, pigment yellow 93, pigment yellow 95, pigment yellow 97, pigment yellow 98, pigment yellow 114, pigment yellow 120, pigment yellow 128, pigment yellow 129, pigment yellow 138, pigment yellow 150, pigment yellow 151, pigment yellow 154, pigment yellow 155, and pigment yellow 180.

Examples of magenta pigments include Pig.Red-based pigments such as pigment red 5, pigment red 7, pigment red 12, pigment red 48 (Ca), pigment red 48 (Mn), pigment red 57 (Ca), pigment red 57:1, pigment red 112, pigment red 122, pigment red 123, pigment red 168, pigment red 184, pigment red 202, and pigment violet 19.

Examples of cyan pigments include Pig.Blue-based pigments such as pigment blue 1, pigment blue 2, pigment blue 3, pigment blue 15, pigment blue 15:3, pigment blue 15:4, pigment blue 16, pigment blue 22, pigment blue 60, vat blue 4, and vat blue 60.

Examples of white pigments include: alkaline earth metal sulfates such as barium sulfate; alkaline earth metal carbonates such as calcium carbonate; silicas such as a minute-particle silicic acid powder and synthetic silicate; calcium silicate; alumina; hydrated alumina; titanium oxide; zinc oxide; talc; and clay.

<<Polymerization Inhibitor>>

Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di(α-methylcyclohexyl)-5,5'-dimethyldiphenylmethane, p-benzoquinone, di-t-butyldiphenylamine, 9,10-di-n-butoxyanthracene, and 4,4' [1,10-dioxo-1,10-decanediylbis(oxy)]bis[2,2,6,6-tetramethyl]-1-piperidinyloxy.

<<Surfactant>>

The surfactant is not particularly limited, and an arbitrary surfactant may be selected according to the purpose. Examples thereof include a higher fatty acid-based surfactant, a silicone-based surfactant, and a fluorine-based surfactant.

It is preferable that the active energy ray-curable inkjet ink of the present invention be solvent-free.

"Being solvent-free" means that the ink does not contain various publicly-known solvents such as ether, ketone, aromatic series, xylene, ethyl ethoxypropionate, ethyl acetate, cyclohexane, diethylene glycol monomethyl ether, diethylene glycol, monoethyl ether, γ-butyrolactone, ethyl lactate, cyclohexane methyl ethyl ketone, toluene, ethyl ethoxy propionate, polymethacrylate or propylene glycol monomethyl ether acetate, ethylene glycol monomethyl ether, diethylene glycol, and triethylene glycol monobutyl ether.

When the active energy ray-curable inkjet ink is solvent-free, there are favorable advantages that no volatile solvent remains in the ink coated film, which secures safety in the printing site and prevents environmental contamination, and that the ink does not dry in the inkjet head, which makes it easy to maintain the inkjet discharging device.

<Physical Properties of Ink>

The viscosity of the active energy ray-curable inkjet ink is preferably from 3 mPa·s to 70 mPa·s at 25° C., and preferably from 3 mPa·s to 16 mPa·s, and more preferably from 10 mPa·s to 13 mPa·s at 60° C.

The viscosities at 25° C. and 60° C. are measured with a cone-plate rotational viscometer manufactured by Toki Sangyo Co., Ltd. with the temperature of hemathermal cyclic water set to 25° C. and 60° C. The temperature of 25° C. assumes a common room temperature condition. The temperature of 60° C. assumes the specifications of a commercially available inkjet discharging head that is heatable, such as GEN4 manufactured by Ricoh Printing Systems, Ltd.

When a cured product obtained by discharging the active energy ray-curable inkjet ink described above onto a base material to form a coated film having an average thickness of 10 μm, and curing the coated film by irradiating it with an active energy ray having a light intensity of 1,500 mJ/cm$^2$ is stretched with a tensile tester at a tension rate of 20 mm/min at a temperature of 180° C., it is preferable that the stretchability of the cured product be 100% or greater, and it is more preferable that the stretchability of the cured product be 120% or greater, where the stretchability=[(cured product length after tensile test−cured product length before tensile test)/(cured product length before tensile test)]×100.

A polycarbonate film (PC) (IUPILON 100FE2000 MASKING manufactured by Mitsubishi Engineering-Plastics Corporation, with a thickness of 100 μm) may be used as the base material.

It is preferable that the pencil hardness of a cured product obtained by curing the active energy ray-curable inkjet ink over a base material in the same manner be HB or greater.

The pencil hardness can be measured according to JIS K5600-5-4, scratch hardness (a pencil process).

(Ink Container)

An ink container of the present invention includes the active energy ray-curable inkjet ink of the present invention described above, and a container, and further includes other members such as an ink bag according to necessity. Therefore, in an operation such as ink replacement, there is no need of touching the ink directly or no risk of the fingers or the wear being contaminated, and it is possible to prevent mixing of foreign matters such as dust into the ink.

Examples of the ink container include an ink cartridge and an ink tank.

The container is not particularly limited, and the shape, structure, size, material, etc. thereof may be appropriately selected according to the purpose. Preferable examples of the container include a container that includes an ink bag formed of an aluminum laminate film, a resin film, or the like.

Figure 1:
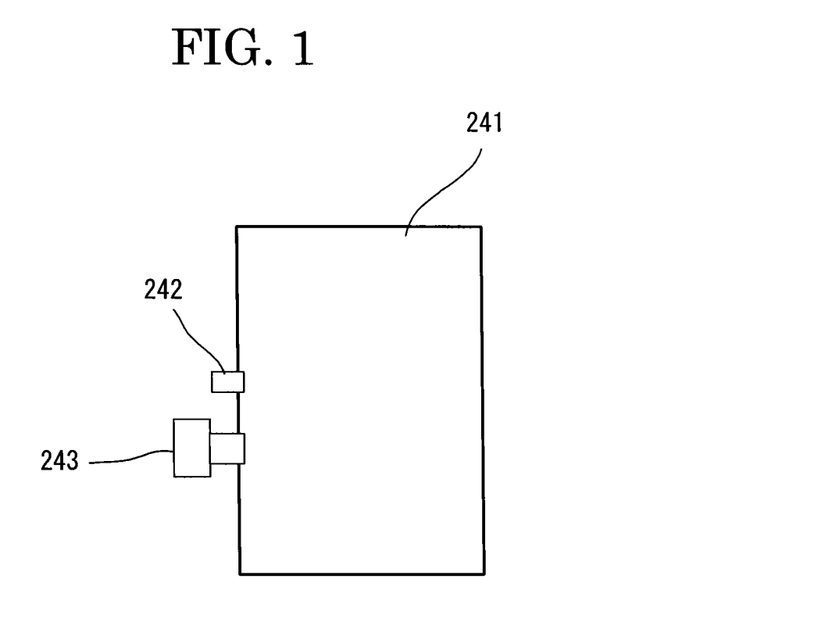
FIG. 1 is a schematic diagram showing an example of an ink cartridge.
Figure 2:
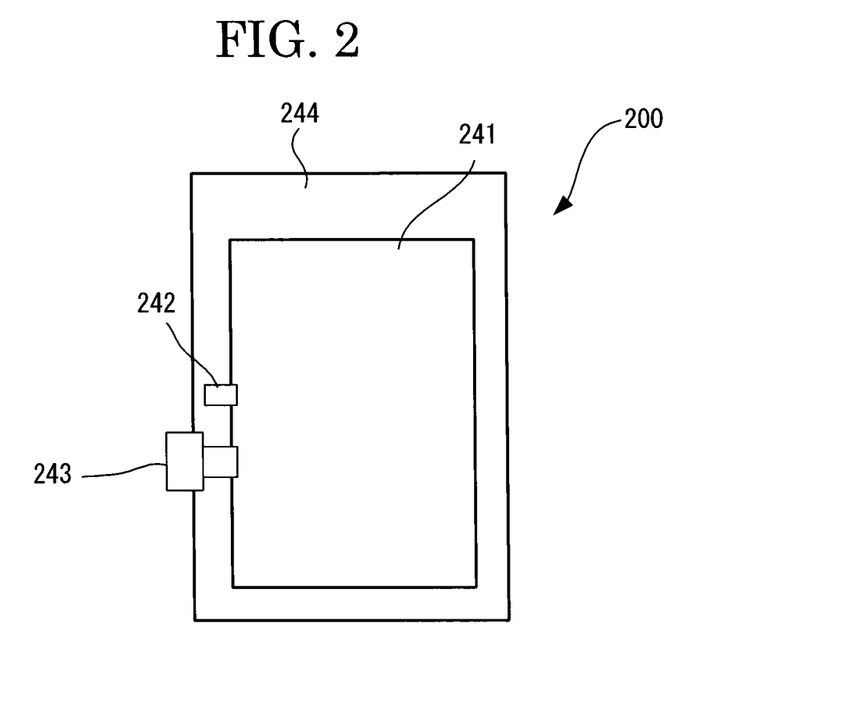
FIG. 2 is a schematic diagram showing the ink cartridge of FIG. 1, including a case thereof.

An ink cartridge, as the ink container, will be explained with reference to FIG. 1 and FIG. 2. FIG. 1 is a schematic diagram showing an example of an ink bag 241 of an ink cartridge. FIG. 2 is a schematic diagram showing an ink cartridge 200 in which the ink bag 241 of FIG. 1 is contained in a cartridge case 244.

As shown in FIG. 1, an ink is filled into the ink bag 241 through an ink injection port 242, the ink bag is deaerated of any residual air, and then the ink injection port 242 is closed by fusion bonding. For use, an ink discharge port 243 formed of a rubber member is pierced with a needle of the device body for the ink to be supplied into the device. The ink bag 241 is formed of an air-impermeable packing material such as an aluminum laminate film. Then, as shown in FIG. 2, the ink bag is contained in the cartridge case 244 typically made of plastic to be completed as the ink cartridge 200, which is used as detachably attached on an inkjet discharging device.

It is preferable that the ink container be attachable on and detachable from an inkjet discharging device of the present invention. This makes it possible to simplify ink refilling or replacement and improve the efficiency of such an operation.

(Inkjet Discharging Device)

An inkjet discharging device of the present invention includes the ink container of the present invention, preferably includes an ink discharging unit and a curing unit, and further includes other units according to necessity.

<Ink Discharging Unit>

The ink discharging unit is a unit configured to discharge an active energy ray-curable inkjet ink onto a surface of a base material according to an inkjet recording scheme.

Examples of the ink discharging unit include a continuous jetting type, and an on-demand type.

Examples of the on-demand type include a piezo type, and a thermal type or an electrostatic type.

—Base Material—

The base material is not particularly limited, and an arbitrary base material may be selected according to the purpose. Examples thereof include paper, plastic, metal, ceramic, and glass, or composite materials of these.

Among these, impenetrable base materials are preferable because the active energy ray-curable inkjet ink of the present invention immediately cures when irradiated with light, and a plastic film and a plastic molded product made of polyethylene, polypropylene, polyethylene terephthalate, polycarbonate, an ABS resin, polyvinyl chloride, polystyrene, an acrylic resin, a polyester resin, a polyamide resin, and a vinyl-based material, or composite materials of these are more preferable.

When polycarbonate is used as the base material, it is preferable to use tetrahydrofurfuryl (meth)acrylate, cyclohexyl (meth)acrylate, benzyl (meth)acrylate, and (meth) acryloyl morpholine as the photopolymerizable compounds, because polycarbonate is highly soluble in them. When an acrylic resin is used as the base material, it is possible to use dimethylaminopropyl acrylamide as the photopolymerizable compound, because the acrylic resin is highly soluble in it.

<Curing Unit>

The curing unit is a unit configured to irradiate the active energy ray-curable inkjet ink discharged onto a surface of the base material with an active energy ray and cure the ink.

Examples of the curing unit include an ultraviolet irradiation device.

<Other Units>

The other units are not particularly limited, and arbitrary units may be selected according to the purpose. Examples thereof include a conveying unit and a control unit.

Figure 3:
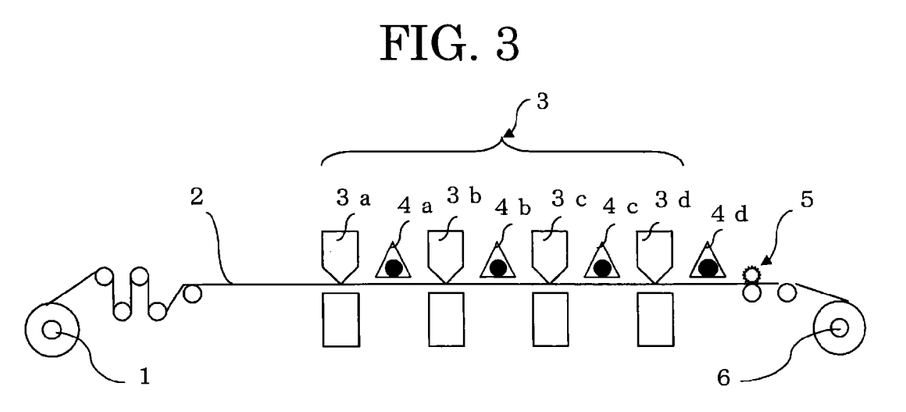
FIG. 3 is a schematic diagram showing an example of an inkjet discharging device of the present invention.

Next, an inkjet discharging device of the present invention will be explained in more detail with reference to FIG. 3. FIG. 3 shows a schematic diagram of an example of configurations around a printing unit.

In FIG. 3, printing units 3 (e.g., including printing units 3a, 3b, 3c, and 3d for yellow, magenta, cyan, and black respectively) include a container for an active energy ray-curable inkjet ink, an ink discharging unit configured to discharge the active energy ray-curable inkjet ink onto a surface of a base material according to an inkjet recording scheme, and a curing unit configured to cure the active energy ray-curable inkjet ink by irradiating it with an active energy ray.

Each of the printing units 3 discharges the ink onto a print target base material 2 (which is conveyed, for example, from the left to the right in FIG. 3) supplied as a base material from a print target base material supply roll 1. The inks are discharged in printing of each of the colors (e.g., yellow, magenta, cyan, and black). After this, in order for the inks to be cured, they are irradiated with light from ultraviolet light sources (curing light sources) 4a, 4b, 4c, and 4d and cured, to thereby form a color image. After this, the print target base material 2 is conveyed to a machining unit 5, and a printed product take-up roll 6.

The printing units 3a, 3b, 3c, and 3d may include a heating mechanism in order to liquefy the inks at the ink discharging portions.

When a print area of a color printed before is large or when the conveying speed is high, the base material may become a high temperature. Therefore, according to necessity, a mechanism for cooling the base material to about room temperature by contact or contactlessly may be provided at a base material holding portion (above or below the print target base material 2 in FIG. 3).

The print target base material 2 may be paper, film, and metal, or composite materials of these. FIG. 3 shows a case where the print target base material 2 has a roll shape, but it may have a sheet shape. The print target base material may be one-side printable or may be both-side printable.

(Cured Product)

A cured product of the present invention is obtained by curing the active energy ray-curable inkjet ink of the present invention. For example, an image obtained with the inkjet discharging device of the present invention is afterwards irradiated with an active energy ray (an ultraviolet ray, an electron beam, etc.). Upon this, the coated film over the base material rapidly cures, and a cured product of the present invention is obtained.

(Decorated Product)

A decorated product of the present invention is obtained by applying a surface decoration formed of the cured product of the present invention to a base material. Examples of the decorated product include the cured product that is afterwards molded.

The decorated product is favorably used for applications that need surface decoration, such as a meter and an operation panel of an automobile, an OA apparatus, electric and electronic appliance, a camera, etc.

EXAMPLES

The present invention will be explained more specifically below by presenting Examples and Comparative Examples. The present invention is not limited to these Examples.

The glass transition temperature of a monofunctional monomer, and the weight average molecular weight of urethane (meth)acrylate, and an oligomer used in Examples and Comparative Examples were measured in the manner described below.

<Glass Transition Temperature of Monofunctional Monomer>

The glass transition temperature (Tg) of the monofunctional monomer means the glass transition temperature of a cured product of the homopolymer of the monofunctional polymer. The glass transition temperature (Tg) was a catalog value when it was the case that there was a catalog value of the manufacturer of the polymerizable monomer, or a value measured according to differential scanning calorimetry (DSC) in the manner described below when it was the case that there was no catalog value.

—Method for Measuring Glass Transition Temperature (Tg)—

The monofunctional monomer was polymerized according to a common solution polymerization procedure.

A: a 10% by mass toluene solution of the monofunctional monomer

B: 5% by mass of azobisisobutyronitrile as a polymerization initiator

The components A and B were sealed in a test tube that was purged with nitrogen, and shaken in a hot bath of 60° C. for 6 hours, to thereby synthesize a polymer. After this, the resultant was reprecipitated in a solvent in which the monofunctional monomer was soluble and the polymer was insoluble (e.g., methanol, and petroleum ether), to thereby filtrate and extract the polymer. The obtained polymer was measured according to DSC. The DSC instrument was DSC120U manufactured by Seiko Instruments Inc. The measurement temperature was from 30° C. to 300° C. The temperature raising rate was 2.5° C. per minute.

<Weight-Average Molecular Weight of Urethane (Meth) Acrylate and Oligomer>

The weight average molecular weight was a standard polystyrene equivalent weight average molecular weight, and measured with a high-performance liquid chromatography ("WATERS 2695 (main device)" and "WATERS 2414 (detector)" manufactured by Nihon Waters K.K.) and three columns in series (columns: SHODEX GPC KF-806L (with an exclusion limit molecular weight: $2\times10^7$, a separation range: from 100 to $2\times10^7$, a number of theoretical plates: 10,000 per column, a filler: a styrene/divinyl benzene copolymer, and a filler particle diameter: 10 μm)).

Examples 1 to 25 and Comparative Examples 1 to 3

—Production of Active Energy Ray-Curable Inkjet Ink—

The materials described in Tables 1 to 8 below were sequentially added while being stirred. After stirring was performed for 1 hour, it was confirmed whether none remained undissolved, the dissolved materials were filtered through a membrane filter to remove any coarse particles that may be the cause of head clogging, to thereby produce the active energy ray-curable inkjet inks of Examples 1 to 25 and Comparative Examples 1 to 3. The values of the photopolymerizable compounds, colorant, and photopolymerization initiator shown in Tables 1 to 8 were in the unit of "part by mass".

Next, the viscosity of each of the produced active energy ray-curable inkjet inks was measured in the manner described below. The results are shown in Tables 1 to 8.

<Viscosity>

The viscosity of the inks was measured with a cone-plate rotational viscometer manufactured by Toki Sangyo Co., Ltd. with the temperature of hemathermal cyclic water set to 25° C. and 60° C. The unit was mPa·s.

Next, cured products were produced with each of the produced active energy ray-curable inkjet ink in the manner described below.

<Production of Cured Product>

With an inkjet discharging device mounted with a head GEN4 (manufactured by Ricoh Printing Systems, Ltd.), each of the obtained active energy ray-curable inkjet inks was discharged onto a polycarbonate base material (IUPILON 100FE2000 MASKING manufactured by Mitsubishi Engineering-Plastics Corporation, with a thickness of 100 μm) to have an average thickness of 10 μm. Immediately after the discharging, with an UV irradiator LH6 manufactured by Fusion Systems Japan Co., Ltd., the ink was irradiated with an ultraviolet ray at a light intensity of 1,500 mJ/cm$^2$, to thereby obtain a cured product.

Pencil hardness, stretchability, and punchability of each of the obtained cured products were evaluated in the manner described below. The results are shown in Tables 1 to 8.

<Pencil Hardness>

The pencil hardness of each of the produced cured product was measured according to JIS K5600-5-4, scratch hardness (a pencil process).

<Stretchability>

The stretchability was evaluated as breaking elongation at 180° C. (tensile test). Each of the cured products was measured with a tensile tester (AUTOGRAPH AGS-5KNX manufactured by Shimadzu Corporation), under conditions where a tension rate was 20 mm/min, the temperature was 180° C., and a sample was a dumbbell specimen (6) according to JIS K6251. The stretchability was expressed as [(length after tensile test–length before tensile test)/(length before tensile test)]×100.

<Punchability>

Each of the cured products was punched through with a punch (No. 150 manufactured by Lion Office Products Corp.), and the condition of a cutout surface thereof was observed with a microscope (POCKET MEASURING MICROSCOPE manufactured by Tokai Sangyo Co., Ltd., at a magnification of ×25). The punchability was evaluated based on the criteria below.

[Evaluation Criteria]

A: The cured product had no cracking at the cutout surface.

B: The cured product had cracking at part of the cutout surface.

BC: The cured product had cracking at almost the whole of the cut out surface.

C: The cured product had severe cracking and peeling at the whole of the cutout surface.

TABLE 1

| Component | | Compound name | Product name | Ex. 1 | Ex. 2 | Ex. 3 | Ex. 4 |
|---|---|---|---|---|---|---|---|
| Photopolymerizable compound | Monofunctional monomer | Isobornyl acrylate | IBXA | | | | 90 |
| | | Hydroxyethyl acrylamide | HEAA | 90 | | 60 | |
| | | Acryloyl morpholine | ACMO | | | | |
| | | 4-acryloyloxymethyl-2-cyclohexyl-1,3-diox | CHDOL-10 | | 90 | 30 | |
| | | Benzyl acrylate | BZA | | | | |
| | | 4-hydroxybutyl acrylate | 4-HBA | | | | |
| | Urethane (meth)acrylate | Polyester-based urethane acrylate | UV-3010B | 10 | 10 | 10 | 10 |
| | | Polyether-based urethane acrylate | UV-3300B | | | | |
| | | Polycarbonate-based urethane acrylate | UV-3310B | | | | |
| | | Polyether-based urethane acrylate | UV-6640B | | | | |
| | | Urethane acrylate | UV-7600B | | | | |
| | Oligomer | Epoxy acrylate oligomer | CN115 | | | | |
| | Bifunctional monomer | 1,3-butylene glycol diacrylate | SR212 | | | | |
| | | 1,9-nonanediol diacrylate | VISCOAT #260 | | | | |
| | | 1,4-butanediol diacrylate | SR213 | | | | |
| | | 1,6-hexanediol diacrylate | SR238F | | | | |
| | | 1,10-decanediol diacrylate | A-DOD-N | | | | |
| | | Neopentyl glycol diacrylate | NP-A | | | | |
| Photopolymerization initiator | | | IRGACURE 184 | 5 | 5 | 5 | 5 |
| Colorant | | Carbon black | | | | | |
| Evaluation result | | Pencil hardness | | HB | HB | HB | HB |
| | | Stretchability (%) | | 200 | 200 | 200 | 200 |
| | | Punchability | | B | B | B | B |
| | | Viscosity (25° C.) (mPa·s) | | 39 | 42 | 40 | 41 |
| | | Viscosity (60° C.) (mPa·s) | | 11 | 12 | 11 | 12 |

TABLE 2

| Component | | Compound name | Product name | Ex. 5 | Ex. 6 | Ex. 7 | Ex. 8 |
|---|---|---|---|---|---|---|---|
| Photopolymerizable compound | Monofunctional monomer | Isobornyl acrylate | IBXA | 90 | 90 | 90 | 90 |
| | | Hydroxyethyl acrylamide | HEAA | | | | |
| | | Acryloyl morpholine | ACMO | | | | |
| | | 4-acryloyloxymethyl-2-cyclohexyl-1,3-diox | CHDOL-10 | | | | |
| | | Benzyl acrylate | BZA | | | | |
| | | 4-hydroxybutyl acrylate | 4-HBA | | | | |
| | Urethane (meth)acrylate | Polyester-based urethane acrylate | UV-3010B | | | 5 | 10 |
| | | Polyether-based urethane acrylate | UV-3300B | 10 | | 5 | |
| | | Polycarbonate-based urethane acrylate | UV-3310B | | 10 | | |
| | | Polyether-based urethane acrylate | UV-6640B | | | | |
| | | Urethane acrylate | UV-7600B | | | | |
| | Oligomer | Epoxy acrylate oligomer | CN115 | | | | |
| | Bifunctional monomer | 1,3-butylene glycol diacrylate | SR212 | | | | 5 |
| | | 1,9-nonanediol diacrylate | VISCOAT #260 | | | | |
| | | 1,4-butanediol diacrylate | SR213 | | | | |
| | | 1,6-hexanediol diacrylate | SR238F | | | | |
| | | 1,10-decanediol diacrylate | A-DOD-N | | | | |
| | | Neopentyl glycol diacrylate | NP-A | | | | |

TABLE 2-continued

| Component | Compound name | Product name | Ex. 5 | Ex. 6 | Ex. 7 | Ex. 8 |
|---|---|---|---|---|---|---|
| Photopolymerization initiator | | IRGACURE 184 | 5 | 5 | 5 | 5 |
| Colorant | Carbon black | | | | | |
| Evaluation result | Pencil hardness | | HB | HB | HB | HB |
| | Stretchability (%) | | 200 | 180 | 200 | 145 |
| | Punchability | | B | B | B | A |
| | Viscosity (25° C.) (mPa · s) | | 30 | 33 | 40 | 40 |
| | Viscosity (60° C.) (mPa · s) | | 8 | 9 | 11 | 12 |

TABLE 3

| Component | | Compound name | Product name | Ex. 9 | Ex. 10 | Ex. 11 | Ex. 12 |
|---|---|---|---|---|---|---|---|
| Photopolymerizable compound | Monofunctional monomer | Isobornyl acrylate | IBXA | | | | |
| | | Hydroxyethyl acrylamide | HEAA | | | | |
| | | Acryloyl morpholine | ACMO | 85 | 85 | 85 | 85 |
| | | 4-acryloyloxymethyl-2-cyclohexyl-1,3-diox | CHDOL-10 | | | | |
| | | Benzyl acrylate | BZA | | | | |
| | | 4-hydroxybutyl acrylate | 4-HBA | | | | |
| | Urethane (meth) acrylate | Polyester-based urethane acrylate | UV-3010B | 10 | 10 | 10 | |
| | | Polyether-based urethane acrylate | UV-3300B | | | | 10 |
| | | Polycarbonate-based urethane acrylate | UV-3310B | | | | |
| | | Polyether-based urethane acrylate | UV-6640B | | | | |
| | | Urethane acrylate | UV-7600B | | | | |
| | Oligomer | Epoxy acrylate oligomer | CN115 | | | | |
| | Bifunctional monomer | 1,3-butylene glycol diacrylate | SR212 | 5 | 2.5 | 2.5 | 5 |
| | | 1,9-nonanediol diacrylate | VISCOAT #260 | | 2.5 | 2.5 | |
| | | 1,4-butanediol diacrylate | SR213 | | | | |
| | | 1,6-hexanediol diacrylate | SR238F | | | | |
| | | 1,10-decanediol diacrylate | A-DOD-N | | | | |
| | | Neopentyl glycol diacrylate | NP-A | | | | |
| Photopolymerization initiator | | | IRGACURE 184 | 5 | 5 | 5 | 5 |
| Colorant | | Carbon black | | | | 3 | |
| Evaluation result | | Pencil hardness | | HB | HB | HB | HB |
| | | Stretchability (%) | | 145 | 140 | 150 | 135 |
| | | Punchability | | A | A | A | A |
| | | Viscosity (25° C.) (mPa · s) | | 40 | 40 | 40 | 30 |
| | | Viscosity (60° C.) (mPa · s) | | 12 | 12 | 13 | 8 |

TABLE 4

| Component | | Compound name | Product name | Ex. 13 | Ex. 14 | Ex. 15 | Ex. 16 |
|---|---|---|---|---|---|---|---|
| Photopolymerizable compound | Monofunctional monomer | Isobornyl acrylate | IBXA | | | | |
| | | Hydroxyethyl acrylamide | HEAA | | | | |
| | | Acryloyl morpholine | ACMO | 85 | 90 | 80 | 60 |
| | | 4-acryloyloxymethyl-2-cyclohexyl-1,3-diox | CHDOL-10 | | | | 25 |
| | | Benzyl acrylate | BZA | | | | |
| | | 4-hydroxybutyl acrylate | 4-HBA | | | | |
| | Urethane (meth) acrylate | Polyester-based urethane acrylate | UV-3010B | | 5 | 15 | 10 |
| | | Polyether-based urethane acrylate | UV-3300B | | | | |
| | | Polycarbonate-based urethane acrylate | UV-3310B | | | | |

TABLE 4-continued

| Component | | Compound name | Product name | Ex. 13 | Ex. 14 | Ex. 15 | Ex. 16 |
|---|---|---|---|---|---|---|---|
| | | Polyether-based urethane acrylate | UV-6640B | 10 | | | |
| | | Urethane acrylate | UV-7600B | | | | |
| | Oligomer | Epoxy acrylate oligomer | CN115 | | | | |
| | Bi-functional monomer | 1,3-butylene glycol diacrylate | SR212 | 5 | 5 | 5 | 5 |
| | | 1,9-nonanediol diacrylate | VISCOAT #260 | | | | |
| | | 1,4-butanediol diacrylate | SR213 | | | | |
| | | 1,6-hexanediol diacrylate | SR238F | | | | |
| | | 1,10-decanediol diacrylate | A-DOD-N | | | | |
| | | Neopentyl glycol diacrylate | NP-A | | | | |
| Photopolymerization initiator | | | IRGACURE 184 | 5 | 5 | 5 | 5 |
| Colorant | | Carbon black | | | | | |
| Evaluation result | | Pencil hardness | | HB | HB | HB | HB |
| | | Stretchability (%) | | 130 | 160 | 100 | 130 |
| | | Punchability | | A | B | A | A |
| | | Viscosity (25° C.) (mPa · s) | | 28 | 15 | 68 | 41 |
| | | Viscosity (60° C.) (mPa · s) | | 7 | 6 | 16 | 12 |

TABLE 5

| Component | | Compound name | Product name | Ex. 17 | Ex. 18 | Ex. 19 | Ex. 20 |
|---|---|---|---|---|---|---|---|
| Photopolymerizable compound | Monofunctional monomer | Isobornyl acrylate | IBXA | | | | |
| | | Hydroxyethyl acrylamide | HEAA | | | | |
| | | Acryloyl morpholine | ACMO | 85 | 85 | 85 | 85 |
| | | 4-acryloyloxymethyl-2-cyclohexyl-1,3-diox | CHDOL-10 | | | | |
| | | Benzyl acrylate | BZA | | | | |
| | | 4-hydroxybutyl acrylate | 4-HBA | | | | |
| | Urethane (meth)acrylate | Polyester-based urethane acrylate | UV-3010B | 10 | 10 | 10 | 10 |
| | | Polyether-based urethane acrylate | UV-3300B | | | | |
| | | Polycarbonate-based urethane acrylate | UV-3310B | | | | |
| | | Polyether-based urethane acrylate | UV-6640B | | | | |
| | | Urethane acrylate | UV-7600B | | | | |
| | Oligomer | Epoxy acrylate oligomer | CN115 | | | | |
| | Bi-functional monomer | 1,3-butylene glycol diacrylate | SR212 | | | | |
| | | 1,9-nonanediol diacrylate | VISCOAT #260 | 5 | | | |
| | | 1,4-butanediol diacrylate | SR213 | | 5 | | |
| | | 1,6-hexanediol diacrylate | SR238F | | | 5 | |
| | | 1,10-decanediol diacrylate | A-DOD-N | | | | 5 |
| | | Neopentyl glycol diacrylate | NP-A | | | | |
| Photopolymerization initiator | | | IRGACURE 184 | 5 | 5 | 5 | 5 |
| Colorant | | Carbon black | | | | | |
| Evaluation result | | Pencil hardness | | HB | HB | HB | HB |
| | | Stretchability (%) | | 144 | 140 | 145 | 140 |
| | | Punchability | | A | A | A | A |
| | | Viscosity (25° C.) (mPa · s) | | 40 | 37 | 38 | 38 |
| | | Viscosity (60° C.) (mPa · s) | | 12 | 11 | 11 | 11 |

TABLE 6

| Component | | Compound name | Product name | Ex. 21 | Ex. 22 | Ex. 23 | Ex. 24 |
|---|---|---|---|---|---|---|---|
| Photo-polymerizable compound | Mono-functional monomer | Isobornyl acrylate | IBXA | | | | |
| | | Hydroxyethyl acrylamide | HEAA | | | | |
| | | Acryloyl morpholine | ACMO | 85 | 80 | 89 | 85 |
| | | 4-acryloyloxymethyl-2-cyclohexyl-1,3-diox | CHDOL-10 | | | | |
| | | Benzyl acrylate | BZA | | | | |
| | | 4-hydroxybutyl acrylate | 4-HBA | | | | |
| | Urethane (meth) acrylate | Polyester-based urethane acrylate | UV-3010B | 10 | 10 | 10 | |
| | | Polyether-based urethane acrylate | UV-3300B | | | | |
| | | Polycarbonate-based urethane acrylate | UV-3310B | | | | |
| | | Polyether-based urethane acrylate | UV-6640B | | | | |
| | | Urethane acrylate | UV-7600B | | | | 10 |
| | Oligomer | Epoxy acrylate oligomer | CN115 | | | | |
| | Bi-functional monomer | 1,3-butylene glycol diacrylate | SR212 | | 10 | 1 | 5 |
| | | 1,9-nonanediol diacrylate | VISCOAT #260 | | | | |
| | | 1,4-butanediol diacrylate | SR213 | | | | |
| | | 1,6-hexanediol diacrylate | SR238F | | | | |
| | | 1,10-decanediol diacrylate | A-DOD-N | | | | |
| | | Neopentyl glycol diacrylate | NP-A | 5 | | | |
| Photopolymerization initiator | | | IRGACURE 184 | 5 | 5 | 5 | 5 |
| Colorant | | Carbon black | | | | | |
| Evaluation result | | Pencil hardness | | HB | HB | HB | HB |
| | | Stretchability (%) | | 130 | 50 | 165 | 30 |
| | | Punchability | | A | A | A | B |
| | | Viscosity (25° C.) (mPa·s) | | 42 | 38 | 40 | 18 |
| | | Viscosity (60° C.) (mPa·s) | | 13 | 11 | 11 | 6 |

TABLE 7

| Component | | Compound name | Product name | Ex. 25 |
|---|---|---|---|---|
| Photo-polymerizable compound | Mono-functional monomer | Isobornyl acrylate | IBXA | |
| | | Hydroxyethyl acrylamide | HEAA | |
| | | Acryloyl morpholine | ACMO | |
| | | 4-acryloyloxymethyl-2-cyclohexyl-1,3-diox | CHDOL-10 | |
| | | Benzyl acrylate | BZA | 85 |
| | | 4-hydroxybutyl acrylate | 4-HBA | |
| | Urethane (meth) acrylate | Polyester-based urethane acrylate | UV-3010B | 10 |
| | | Polyether-based urethane acrylate | UV-3300B | |
| | | Polycarbonate-based urethane acrylate | UV-3310B | |
| | | Polyether-based urethane acrylate | UV-6640B | |
| | | Urethane acrylate | UV-7600B | |
| | Oligomer | Epoxy acrylate oligomer | CN115 | |
| | Bi-functional monomer | 1,3-butylene glycol diacrylate | SR212 | 5 |
| | | 1,9-nonanediol diacrylate | VISCOAT #260 | |
| | | 1,4-butanediol diacrylate | SR213 | |
| | | 1,6-hexanediol diacrylate | SR238F | |
| | | 1,10-decanediol diacrylate | A-DOD-N | |
| | | Neopentyl glycol diacrylate | NP-A | |
| Photopolymerization initiator | | | IRGACURE 184 | 5 |
| Colorant | | Carbon black | | |
| Evaluation result | | Pencil hardness | | HB |
| | | Stretchability (%) | | 130 |
| | | Punchability | | B |
| | | Viscosity (25° C.) (mPa·s) | | 28 |
| | | Viscosity (60° C.) (mPa·s) | | 8 |

TABLE 8

| Component | | Compound name | Product name | Comp. Ex. 1 | Comp. Ex. 2 | Comp. Ex. 3 |
|---|---|---|---|---|---|---|
| Photo-polymerizable compound | Mono-functional monomer | Isobornyl acrylate | IBXA | | | |
| | | Hydroxyethyl acrylamide | HEAA | 100 | | |
| | | Acryloyl morpholine | ACMO | | | 85 |
| | | 4-acryloyloxymethyl-2-cyclohexyl-1,3-diox | CHDOL-10 | | | |
| | | Benzyl acrylate | BZA | | | |
| | | 4-hydroxybutyl acrylate | 4-HBA | | 90 | |

TABLE 8-continued

| Component | | Compound name | Product name | Comp. Ex. 1 | Comp. Ex. 2 | Comp. Ex. 3 |
|---|---|---|---|---|---|---|
| | Urethane (meth) acrylate | Polyester-based urethane acrylate | UV-3010B | | 10 | |
| | | Polyether-based urethane acrylate | UV-3300B | | | |
| | | Polycarbonate-based urethane acrylate | UV-3310B | | | |
| | | Polyether-based urethane acrylate | UV-6640B | | | |
| | | Urethane acrylate | UV-7600B | | | |
| | Oligomer | Epoxy acrylate oligomer | CN115 | | | 10 |
| | Bi-functional monomer | 1,3-butylene glycol diacrylate | SR212 | | | 5 |
| | | 1,9-nonanediol diacrylate | VISCOAT #260 | | | |
| | | 1,4-butanediol diacrylate | SR213 | | | |
| | | 1,6-hexanediol diacrylate | SR238F | | | |
| | | 1,10-decanediol diacrylate | A-DOD-N | | | |
| | | Neopentyl glycol diacrylate | NP-A | | | |
| Photopolymerization initiator | | | IRGACURE 184 | 5 | 5 | 5 |
| Colorant | | Carbon black | | | | |
| Evaluation result | | Pencil hardness | | F | 2B | HB |
| | | Stretchability (%) | | 200 | 200 | 60 |
| | | Punchability | | C | B | BC |
| | | Viscosity (25° C.) (mPa · s) | | 13 | 40 | 17 |
| | | Viscosity (60° C.) (mPa · s) | | 5 | 11 | 7 |

The details of the materials used in Examples and Comparative Examples are as follows.
<Photopolymerizable Compounds>
—Monofunctional Monomer of which Homopolymer has Glass Transition Temperature of 90° C. Or Higher—
Hydroxyethyl acrylamide ("HEAA" manufactured by Kohjin Co., Ltd., with a glass transition temperature (Tg) of 98° C.)
—Monofunctional Monomer Having Ring Structure—
4-acryloyloxymethyl-2-cyclohexyl-1,3-dioxolan ("CH-DOL-10" manufactured by Osaka Organic Chemical Industry Ltd., with a glass transition temperature (Tg) of 22° C.)
Benzyl acrylate ("BZA" manufactured by Osaka Organic Chemical Industry Ltd., with a glass transition temperature (Tg) of 6° C.)
—Monofunctional Monomer of which Homopolymer has Glass Transition Temperature of 90° C. Or Higher, and that has Ring Structure—
Isobornyl acrylate ("IBXA" manufactured by Osaka Organic Chemical Industry Ltd., with a glass transition temperature (Tg) of 97° C.)
Acryloyl morpholine ("ACMO" manufactured by Kohjin Co., Ltd., with a glass transition temperature (Tg) of 145° C.)
—Comparative Monomer: Monofunctional Monomer of which Homopolymer has Glass Transition Temperature of Less than 90° C., and that does not have Ring Structure—
4-hydroxybutyl acrylate ("4-HBA" manufactured by Osaka Organic Chemical Industry Ltd., with a glass transition temperature (Tg) of −32° C.)
—Urethane (Meth)Acrylate—
Polyester-based urethane acrylate ("UV-3010B" manufactured by Nippon Synthetic Chemical Industry Co., Ltd., with a weight average molecular weight Mw of 9,690, and a number of unsaturated carbon-carbon bonds of 2)
Polyether-based urethane acrylate ("UV-3300B" manufactured by Nippon Synthetic Chemical Industry Co., Ltd., with a weight average molecular weight Mw of 13,000, and a number of unsaturated carbon-carbon bonds of 2)
Polycarbonate-based urethane acrylate ("UV-3310B" manufactured by Nippon Synthetic Chemical Industry Co., Ltd., with a weight average molecular weight Mw of 5,000, and a number of unsaturated carbon-carbon bonds of 2)
Polyether-based urethane acrylate ("UV-6640B" manufactured by Nippon Synthetic Chemical Industry Co., Ltd., with a weight average molecular weight Mw of 5,000, and a number of unsaturated carbon-carbon bonds of 2)
Urethane acrylate ("UV-7600B" manufactured by Nippon Synthetic Chemical Industry Co., Ltd., with a number of unsaturated carbon-carbon bonds of 6, and a weight average molecular weight Mw of 1,400)
—Comparative Oligomer: Non-Urethane (Meth)Acrylate—
Epoxy acrylate oligomer ("CN115" manufactured by Sartomer Company, Inc., with a viscosity of 40,000 mPa·s (25° C.), a number of unsaturated carbon-carbon bonds of 2, and a weight average molecular weight Mw of 400 or greater)
—Bifunctional Monomer—
1,3-butylene glycol diacrylate ("SR212" manufactured by Sartomer Company Inc.)
1,9-nonanediol diacrylate ("VISCOAT#260" manufactured by Osaka Organic Chemical Industry Ltd.)
1,4-butanediol diacrylate ("SR213" manufactured by Sartomer Company Inc.)
1,6-hexanediol diacrylate ("SR238F" manufactured by Sartomer Company Inc.)
1,10-decanediol diacrylate ("A-DOD-N" manufactured by Shin-Nakamura Chemical Co., Ltd.)
Neopentyl glycol diacrylate ("LIGHT ACRYLATE NP-A" manufactured by Nippon Kayaku Co., Ltd.)
—Photopolymerization Initiator—
IRGACURE 184 (manufactured by BASF Corporation)
—Carbon Black—
The blending amount of carbon black is indicated to represent a condition of including CARBON BLACK #10 manufactured by Mitsubishi Chemical Corporation and POLYMER DISPERSANT 532000 manufactured by Nippon Lubrizol Corporation at a mass ratio of 3:1.

Aspects of the present invention are as follows, for example.

<1> An active energy ray-curable inkjet ink, including at least:
photopolymerizable compounds,
wherein the photopolymerizable compounds include:
at least one monofunctional monomer selected from the group consisting of a monofunctional monomer of which homopolymer has a glass transition temperature of 90° C. or higher, a monofunctional monomer having a ring structure, and a monofunctional monomer of which homopolymer has a glass transition temperature of 90° C. or higher and that has a ring structure; and
urethane (meth)acrylate.

<2> The active energy ray-curable inkjet ink according to <1>,
wherein a cured product obtained by discharging the active energy ray-curable inkjet ink onto a base material to form a coated film having an average thickness of 10 μm, and curing the coated film by irradiating it with an active energy ray having a light intensity of 1,500 mJ/cm$^2$ has stretchability of 100% or greater when the cured product is stretched with a tensile tester at a tension rate of 20 mm/min at a temperature of 180° C., where the stretchability=[(length after tensile test−length before tensile test)/(length before tensile test)]×100, and
wherein the cured product has pencil hardness of HB or greater.

<3> The active energy ray-curable inkjet ink according to <1> or <2>,
wherein the urethane (meth)acrylate has 2 or more unsaturated carbon-carbon bonds and a weight average molecular weight of from 5,000 to 13,000, and
wherein the urethane (meth)acrylate is polyester-based urethane (meth)acrylate, polyether-based urethane (meth)acrylate, or polycarbonate-based urethane (meth)acrylate, or any combination thereof.

<4> The active energy ray-curable inkjet ink according to any one of <1> to <3>,
wherein the urethane (meth)acrylate is polycarbonate-based urethane (meth)acrylate having 2 or more unsaturated carbon-carbon bonds, and
wherein the at least one monofunctional monomer is acryloyl morpholine.

<5> The active energy-ray curable inkjet ink according to any one of <1> to <4>, further including:
one or more kinds of bifunctional photopolymerizable compounds.

<6> The active energy ray-curable inkjet ink according to any one of <1> to <5>,
wherein the active-energy ray-curable inkjet ink is solvent-free.

<7> The active energy ray-curable inkjet ink according to any one of <1> to <6>, further including:
a photopolymerization initiator.

<8> The active energy ray-curable inkjet ink according to any one of <1> to <7>, further including:
a colorant.

<9> An ink container, including:
a container: and
the active energy ray-curable inkjet ink according to any one of <1> to <8> contained in the container.

<10> An inkjet discharging device, including:
the ink container according to <9>.

<11> The inkjet discharging device according to <10>, including:
an ink discharging unit configured to discharge the active energy ray-curable inkjet ink onto a surface of a base material according to an inkjet recording scheme; and
a curing unit configured to cure the active energy ray-curable inkjet ink discharged onto the surface of the base material by irradiating it with an active energy ray.

<12> A cured product,
wherein the cured product is obtained by curing the active energy ray-curable inkjet ink according to any one of <1> to <8> by irradiating it with an active energy ray.

<13> A decorated product,
wherein the decorated product is obtained by applying a surface decoration formed of the cured product according to <12> to a base material.

This application claims priority to Japanese application No. 2013-236027, filed on Nov. 14, 2013 and incorporated herein by reference, and Japanese application No. 2014-152731, filed on Jul. 28, 2014 and incorporated herein by reference.

What is claimed is:

1. An active energy ray-curable inkjet ink, comprising:
photopolymerizable compounds,
wherein a cured product obtained by discharging the active energy ray-curable inkjet ink onto a base material to form a coated film having an average thickness of 10 μm, and curing the coated film by irradiating it with an active energy ray having a light intensity of 1,500 mJ/cm$^2$ has stretchability of 100% or greater when the cured product is stretched with a tensile tester at a tension rate of 20 mm/min at a temperature of 180° C., where the stretchability=[(length after tensile test−length before tensile test)/(length before tensile test)]× 100, and
wherein the cured product has pencil hardness of HB or greater.

2. The active energy ray-curable inkjet ink according to claim 1,
wherein the photopolymerizable compounds comprise:
at least one monofunctional monomer selected from the group consisting of acryloyl morpholine, N-vinyl caprolactam, and isobornyl acrylate.

3. The active energy ray-curable inkjet ink according to claim 1,
wherein the photopolymerizable compounds comprise:
at least one monofunctional monomer selected from the group consisting of a monofunctional monomer of which homopolymer has a glass transition temperature of 90° C. or higher, a monofunctional monomer having a ring structure, and a monofunctional monomer of which homopolymer has a glass transition temperature of 90° C. or higher and that has a ring structure; and
urethane (meth)acrylate.

4. The active energy ray-curable inkjet ink according to claim 3,
wherein the urethane (meth)acrylate has 2 or more unsaturated carbon-carbon bonds and a weight average molecular weight of from 5,000 to 13,000, and
wherein the urethane (meth)acrylate is polyester-based urethane (meth)acrylate, polyether-based urethane (meth)acrylate, or polycarbonate-based urethane (meth)acrylate, or any combination thereof.

5. The active energy ray-curable inkjet ink according to claim 3, wherein the urethane (meth)acrylate is polycarbonate-based urethane (meth)acrylate having 2 or more unsaturated carbon-carbon bonds, and wherein the at least one monofunctional monomer is acryloyl morpholine.

6. The active energy ray-curable inkjet ink according to claim 1, wherein the active energy ray-curable inkjet ink further comprises:

one or more kinds of bifunctional photopolymerizable compounds.

7. The active energy ray-curable inkjet ink according to claim 1, wherein the active energy ray-curable inkjet ink is solvent-free.

8. The active energy ray-curable inkjet ink according to claim 1, wherein the active energy ray-curable inkjet ink further comprises:

a photopolymerization initiator.

9. The active energy ray-curable inkjet ink according to claim 1, wherein the active energy ray-curable inkjet ink further comprises:

a colorant.

10. An ink container, comprising:

a container; and the active energy ray-curable inkjet ink according to claim 1.

11. An inkjet discharging device, comprising:

an ink container, wherein the ink container comprises:

a container; and the active energy ray-curable inkjet ink according to claim 1.

12. The inkjet discharging device according to claim 11, wherein the inkjet discharging device further comprises:

an ink discharging unit configured to discharge the active energy ray-curable inkjet ink onto a surface of a base material according to an inkjet recording scheme; and a curing unit configured to cure the active energy ray-curable inkjet ink discharged onto the surface of the base material by irradiating it with an active energy ray.

* * * * *